US007938880B2

(12) United States Patent
Nagai

(10) Patent No.: US 7,938,880 B2
(45) Date of Patent: May 10, 2011

(54) APPARATUS FOR REMOVING RUTHENIUM FROM SOLUTION CONTAINING PLATINUM GROUP METAL

(75) Inventor: Hifumi Nagai, Oita (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

(21) Appl. No.: 12/700,548

(22) Filed: Feb. 4, 2010

(65) Prior Publication Data

US 2010/0135875 A1 Jun. 3, 2010

Related U.S. Application Data

(62) Division of application No. 11/798,290, filed on May 11, 2007, now abandoned.

(30) Foreign Application Priority Data

Sep. 29, 2006 (JP) ................................. 2006-266166

(51) Int. Cl.
  *C22B 60/00* (2006.01)
(52) U.S. Cl. ........................................... 75/393; 75/720
(58) Field of Classification Search .................... 75/393, 75/720
  See application file for complete search history.

(56) References Cited

U.S. PATENT DOCUMENTS

| 3,710,107 | A | 1/1973 | Warren et al. |
| 4,938,895 | A | 7/1990 | Motojima |
| 7,129,170 | B2 | 10/2006 | Phillips et al. |
| 2001/0021361 | A1* | 9/2001 | Grehl et al. ..................... 75/720 |

FOREIGN PATENT DOCUMENTS

| CN | 582 541 A5 | 12/1976 |
| JP | 2004-332041 | 11/2004 |
| JP | 2006-161096 | 6/2006 |

OTHER PUBLICATIONS

Non-Final Office Action issued Nov. 5, 2009 in U.S. Appl. No. 11/798,290.
Final Office Action issued Jun. 17, 2009 in U.S. Appl. No. 11/798,290.
Non-Final Office Action issued Dec. 24, 2008 in U.S. Appl. No. 11/798,290.
Watanabe et al.; Volatile ruthenium—problems on analytical chemistry and health physics—The Journal of the Atomic Energy Society of Japan, vol. 28, pp. 493-500, Dec. 1986, with English Language Abstract.
Advisory Action issued Sep. 23, 2009 in U.S. Appl. No. 11/798,290.

* cited by examiner

*Primary Examiner* — Scott Kastler
(74) *Attorney, Agent, or Firm* — Birch, Stewart, Kolasch & Birch, LLP

(57) ABSTRACT

The invention provides an apparatus for effectively removing ruthenium when ruthenium is removed from a solution containing platinum group metal by oxidation distillation. The invention provides an apparatus for selectively removing ruthenium from a solution containing ruthenium and other platinum group metal by adding an oxidizer to the solution to convert ruthenium into ruthenium tetroxide, wherein air is sucked into a reaction tank by reducing pressure within the reaction tank, and at least one outlet of the air is arranged in the apparatus such that the lowermost part thereof is located at the height of 5-20 m from the bottom of the reaction tank, whereby the solution within the reaction tank can be effectively stirred without ruthenium tetroxide, which has large specific gravity, being concentrated at the bottom of the reaction tank.

2 Claims, 3 Drawing Sheets

APPARATUS FOR REMOVING RUTHENIUM FROM SOLUTION CONTAINING PLATINUM GROUP METAL

This application is a Divisional Application of application Ser. No. 11/798,290 filed on May 11, 2007 now abandoned, and for which priority is claimed under 35 U.S.C. §120 and which claims priority of Application No. 2006-266166, filed in Japan on Sep. 29, 2006, under 35 U.S.C. §119. The entire contents of all references are hereby incorporated by reference.

TECHNICAL FIELD

The invention relates to an apparatus for selectively removing ruthenium from solutions containing platinum group metal such as the post-leaching liquid of electrolytic copper slime.

BACKGROUND OF THE INVENTION

Oxidation distillation method using the volatility of ruthenium tetroxide ($RuO_4$) is known as a method for separating and recovering ruthenium. For example, Journal of the Atomic Energy Society of Japan (Vol. 28, pp. 493-500) discloses a method for recovering ruthenium tetroxide by adding an oxidizer to a residue containing platinum group metal, dissolving it by alkali fusion, and flowing chlorine through the solution, and a method for recovering ruthenium tetroxide into a caustic soda solution by dissolving a ruthenium-containing precipitate in nitric acid, adding potassium permanganate to the solution, and blowing air into the solution. In these methods, a gas-induction tube is inserted into a flask heated by a heating mantle, and gas is introduced into it.

Japanese Patent Application Laid-Open Publication No. 2004-332041 discloses a method for separating and recovering ruthenium by distilling ruthenium tetroxide from a solution containing platinum group metal using sodium bromate ($NaBrO_3$), etc. as an oxidizer.

Japanese Patent Application Laid-Open Publication No. 2004-353480 relates to a method for recovering ruthenium by introducing ruthenium tetroxide vapor into a hydrochloric acid solution and converting it into ruthenium chloride. However, this method suffered from a problem that when air is blown into the solution to enhance efficiency of the recovery, harmful ruthenium tetroxide vapor might leak out from a connection, and the connection might be disengaged or blown out due to the increased pressure when a possible clogging occurs. Therefore, this publication discloses a method in which the pressure within the apparatus is reduced by a suction pump, and ruthenium tetroxide is transferred from a reaction tank into the hydrochloric acid solution along with the sucked air. The publication also states that the range of pH must be 0.5-2.5 for the conversion into ruthenium tetroxide by sodium bromate, and the oxidizer with sufficient concentration is necessary to efficiently convert ruthenium into ruthenium tetroxide before pH is raised by the decomposition of the oxidizer.

There is a problem that ruthenium tetroxide, which has large specific gravity, tends to accumulate and remain in the bottom of the reaction tank when ruthenium tetroxide is transferred from the reaction tank into the hydrochloric acid solution along with the introduced air under reduced pressure created by the suction pump. If ruthenium is remained in the reaction tank, it hinders the recovery of platinum group metal other than ruthenium from the solution.

Therefore, stirring of the solution within the reaction tank was first examined. As it was not suitable to use resin or metal as a material for the apparatus since ruthenium tetroxide is highly oxidative, the material was limited to glass, quartz or the like. However, it was found out that stirring under reduced pressure while keeping a good sealing property was difficult when these materials were used. Consequently, it was necessary to flow air for a long time to remove ruthenium tetroxide from the reaction tank.

SUMMARY OF THE INVENTION

The invention was created to solve these problems, and provide a method for effectively removing ruthenium when ruthenium is selectively removed from a solution containing platinum group metal by oxidation distillation.

The inventor has examined a method for improving the distillation efficiency with an apparatus for selectively removing ruthenium from a solution containing ruthenium and at least one other platinum group metal selected from the group consisting of platinum, palladium, rhodium and iridium by converting ruthenium in the solution into ruthenium tetroxide, and stirring the solution in a reaction tank by air introduced to remove ruthenium tetroxide, thereby dispersing ruthenium tetroxide, which has large specific gravity. As a result of the examination, the inventor has found out that it is important to flow air from the height of 5-20 mm from the bottom of the reaction tank to effectively distill ruthenium tetroxide.

Accordingly,
(1) The invention provides an apparatus for selectively removing ruthenium from a solution containing ruthenium and at least one other platinum group metal selected from the group consisting of platinum, palladium, rhodium and iridium by adding an oxidizer to the solution to convert ruthenium into ruthenium tetroxide, wherein the solution in a reaction tank is stirred by air sucked into the reaction tank by reducing the pressure within the reaction tank, and at least one outlet of the air is arranged such that the lowermost part of thereof is positioned at the height of 5-20 mm from the bottom of the reaction tank.

EFFECT OF THE INVENTION

By using the method and apparatus according to the invention for separating and recovering ruthenium from a solution containing platinum group metal, following effects may be obtained.
(1) Ruthenium can be removed from the solution containing ruthenium and at least one other platinum group metal selected from the group consisting of platinum, palladium, rhodium and iridium with a single distillation operation.
(2) Precipitation of ruthenium tetroxide is prevented, thereby ruthenium can be removed effectively from the solution.

DESCRIPTION OF THE PREFERRED EMBODIMENT

Figure 1:
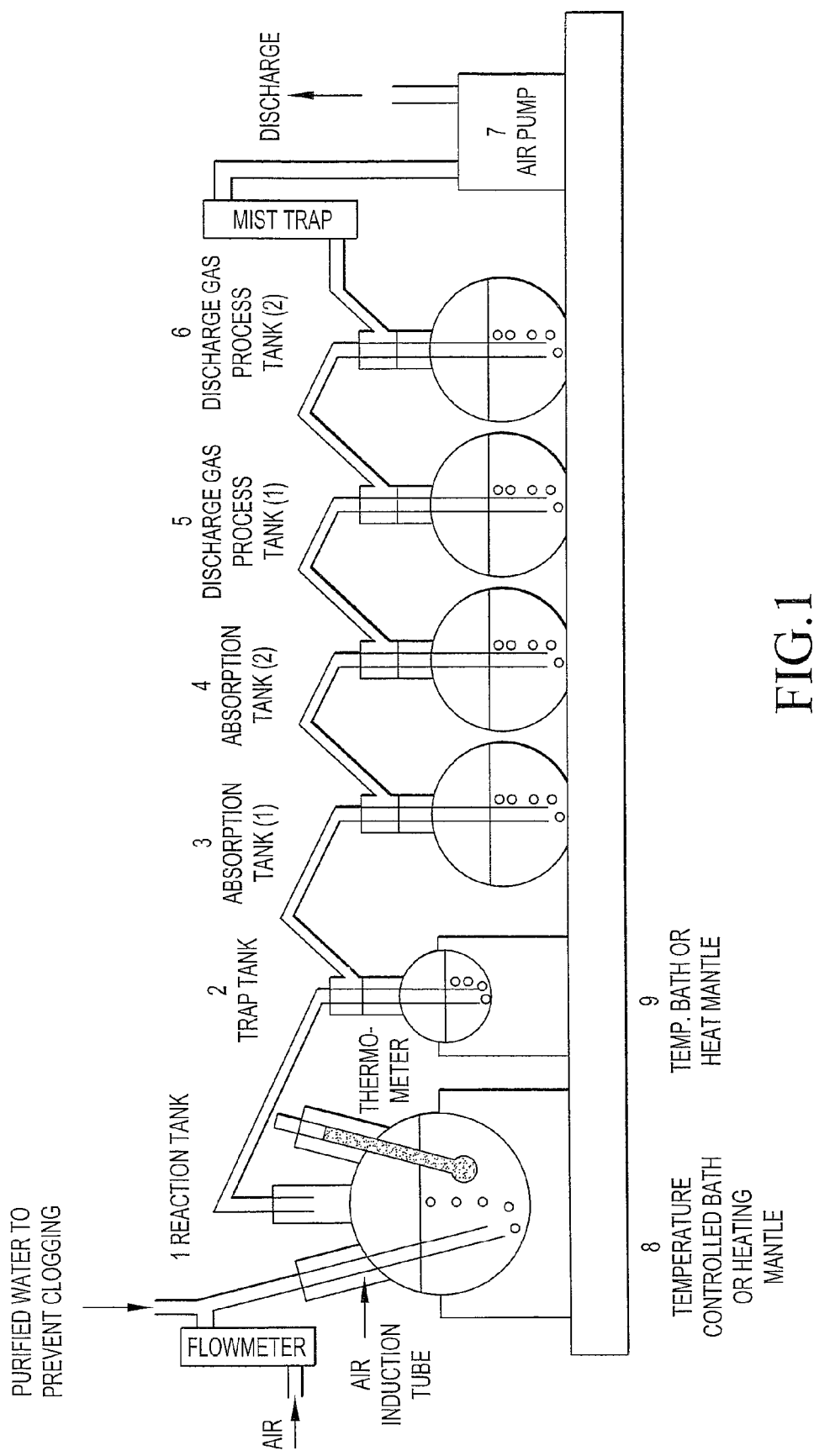
FIG. 1 illustrates a ruthenium distillation apparatus used for Examples and Comparative Examples.

The invention will be explained in detail below. The object of the invention is to remove ruthenium effectively from a solution containing platinum group metal. Oxidation distillation method has been known from long ago as a method for recovering ruthenium by converting ruthenium into volatile ruthenium tetroxide, distilling it, and leading it to a hydrochloric acid solution or a sodium hydroxide solution. If sodium bromate is used as an oxidizer, ruthenium can be converted to ruthenium tetroxide by adjusting pH within the range of 0.5-2.5. The converted ruthenium tetroxide is introduced into a hydrochloric acid solution along with air sucked into the reaction tank by reducing the pressure within the reaction tank using a suction pump, and recovered as a ruthenium chloride solution.

Ruthenium is recovered from the ruthenium chloride solution as ruthenium powder by using any known method in the art. For example, it includes a method for reducing it to ruthenium powder by adding reducing agents such as formic acid, and a method in which ammonium chloride is added to form precipitate of ammonium ruthenium chloride and the precipitate is decomposed under a reducing atmosphere.

Meanwhile, a small amount of ruthenium sometimes remains in the platinum solution in the reaction tank. Since the boiling point of ruthenium tetroxide is about 130° C. and higher than that of water, part of ruthenium tetroxide is in a liquid phase in the reaction tank. Consequently, ruthenium tetroxide, which has large specific gravity, concentrates at the bottom of the reaction tank, causing a problem that ruthenium tends to remain in the reaction tank.

If the purpose of the process is to recover ruthenium, it might not be problematic because it merely reduce the rate of recovery slightly, but if the purpose is to refine platinum group metal other than ruthenium, this small amount of the ruthenium residue might cause a significant problem. Therefore, if ruthenium is not sufficiently removed with a single distillation operation, the second distillation operation should be conducted after pH of the solution, which has been changed due to the decomposition of the oxidizer during the first distillation operation, is re-adjusted after decomposing the oxidizer, or alternatively other methods, such as a solvent extraction method and an ion exchange method should be conducted in order to remove the remaining ruthenium.

The reason why ruthenium remains in the bottom of the reaction tank is that ruthenium tetroxide concentrates and accumulates at the bottom of the reaction tank due to its larger specific gravity, thereby it is resistant to volatilizing. It is therefore necessary to stir the solution in the reaction tank in a manner sufficient to disperse ruthenium tetroxide as fine droplets within the solution, making ruthenium tetroxide more prone to volatilize.

Accordingly, the inventor examined a method for stirring the solution comprising inserting into the solution a stirring blade driven by a motor, and a method for stirring the solution comprising inserting into the solution a stirring bar coated with Teflon or glass driven by a magnetic stirrer. Since ruthenium tetroxide is highly oxidative and readily reacts with resin or metal, it is desirable to use glass, quartz and the like, rather than resin or metal as the material for the apparatus according to the invention.

In case of inserting a stirring blade, the rotating section must be sealed completely as ruthenium tetroxide is toxic and volatile. However, it was difficult to seal the rotating section with glass, quartz and the like.

In case of inserting a stirring bar and stirring with a magnetic stirrer, there were problems that when the stirring bar is coated with Teflon, black ruthenium dioxide was generated by the reaction between Teflon and ruthenium tetroxide, and that when the stirring bar is coated with glass, the vessel was likely to be damaged by the frictional wear with glass. In addition, sufficient stirring effect was not obtained when the amount of liquid was large, although it was not problematic when the amount of liquid was small.

As ruthenium tetroxide, which volatilized in the reaction tank, is transferred to an absorption tank, in which it is recovered as ruthenium chloride, it is desirable to distill it with flowing air to effectively recover ruthenium tetroxide. Accordingly, the inventor examined a stirring method, in which air was blown into the reaction tank through a glass tube (air-induction tube) having an air-blowing outlet located within the reaction tank in order to stir the solution in the reaction tank. However, there were possibilities that toxic ruthenium tetroxide vapor might leak out from a connection, and the connection might be disengaged or blown out due to the pressure caused by possible clogging.

Then, the inventor has found out that stirring effect similar to the case where air is blown into is obtained by reducing the pressure within the apparatus using a suction pump located on the absorption tank side such that air is sucked in from an air outlet located within the reaction tank.

Further, by reducing the pressure within the apparatus, the leaking out of toxic ruthenium tetroxide vapor is prevented. Even if there is a gap in the connection, the process does not suffer from any substantial adverse effects by using a proper suction pump to introduce necessary amount of air into the reaction tank although the amount of discharged air will increase. When the same amount of air is flown, the size of air bubbles can become larger, and stirring force can be stronger compared with the case where air is blown into by the application of pressure. Further, even if clogging is occurred, neither the apparatus is pressurized nor the pressure becomes lower than the negative pressure of the suction pump.

Brittle materials such as glass and quartz are more resistant to compression force than to tensile force. Since the negative pressure applied to the apparatus generates compression force to the apparatus, the apparatus is advantageously less prone to being broken. The apparatus is preferably assembled from round shape components such as a round-bottom flask and cylindrical pipe not to have corners to which stress is concentrated when the apparatus is negatively pressurized.

When the reaction tank is stirred by flowing air under the reduced pressure using a suction pump as explained above, there is a problem that the stirring force is weak in areas in which air bubbles do not pass through, while sufficient stirring force is obtained in areas in which air bubbles pass through. When the stirring is conducted by air, stirring the bottom area of the tank is difficult since air bubbles are resistant to going below the air outlet, while most areas above the air outlet may be stirred by increasing the number of outlets. Since ruthenium tetroxide has large specific gravity and tends to concentrate at the bottom of the reaction tank, it is necessary to efficiently make ruthenium tetroxide in the form of fine droplets.

Accordingly, the inventor made the reaction tank with a round-bottom flask made of heat-resistant glass such that liquid phase ruthenium tetroxide gathers at the bottom area of the reaction tank, and has found out that ruthenium may be completely removed by changing the position of the air outlet. The position of the air outlet is important for stirring ruthenium tetroxide gathered at the bottom of the reaction tank.

It was found out from the experiments for determining the appropriate position of the air outlet that the height of the lowermost part of the air outlet is desirably 5-20 mm from the bottom of the reaction tank. By arranging the air outlet within this range, ruthenium may be completely removed with a single distillation operation.

Incidentally, it should be understood that the shape of the reaction tank is not limited to the round-bottom flask. In case of a reaction tank having relatively wider bottom area or having plural bottom areas, plural air outlets may be provided, for example. The material of the reaction tank is also not limited to heat-resistant glass.

The reason why the preferable position of the lowermost part of the air outlet is 5-20 mm from the bottom of the reaction tank will be explained hereinafter. To sufficiently remove ruthenium with a single distillation operation, the reaction tank needs to be stirred thoroughly to its bottom, and it is desirable that air bubbles should reach the bottom of the reaction tank.

However, since air bubbles go upward immediately from the air outlet, the air outlet is preferably located near the bottom. From the experiments, it was found out that the amount of ruthenium remained in the reaction tank increased when the air-blowing outlet was located above 20 mm from the bottom of the reaction tank.

On the other hand, when the distance between the air outlet and the bottom is too short, air is not discharged easily from the air outlet, and air bubbles between the induction tube and the bottom of the reaction tank may cause abnormal vibration, which could damage the apparatus. Therefore, the height of the lowermost part of the air outlet from the bottom of the reaction tank is desirably equal to or more than 5 mm.

The shape of the air outlet affects the size of air bubbles and the stirring force. When the opening is smaller, the stirring force becomes weaker and clogging occurs more easily due to salt deposited at the air outlet. When the opening is larger, air bubbles become larger and they may cause abnormal vibration on the liquid surface. Although the appropriate inside diameter of the opening depends on the amount of liquid in the reaction tank and the amount of air, it is generally around 5-30 mm.

Non-limiting examples of the amount of air flowing through the air-induction tube per one minute is, as a guideline, from 1/5 to 2 times as much as the amount of the liquid in the reaction tank. When the amount of air is too small, the stirring effect is insufficient, and it requires a longer time to transfer volatilized ruthenium tetroxide to the absorption tank. On the other hand, when the amount of air is too large, the bulk of the liquid in the reaction tank increases, thereby the scatter of the liquid becomes fierce and some of the reaction liquid may fly into the absorption tank and degrade the quality of the recovered ruthenium. The pressure within the reaction tank affects the amount of introduced air and the rate of volatilization of ruthenium tetroxide, and is preferably lower than the atmospheric pressure by the order of 5-30 kPa.

EXAMPLE 1

Figure 2:
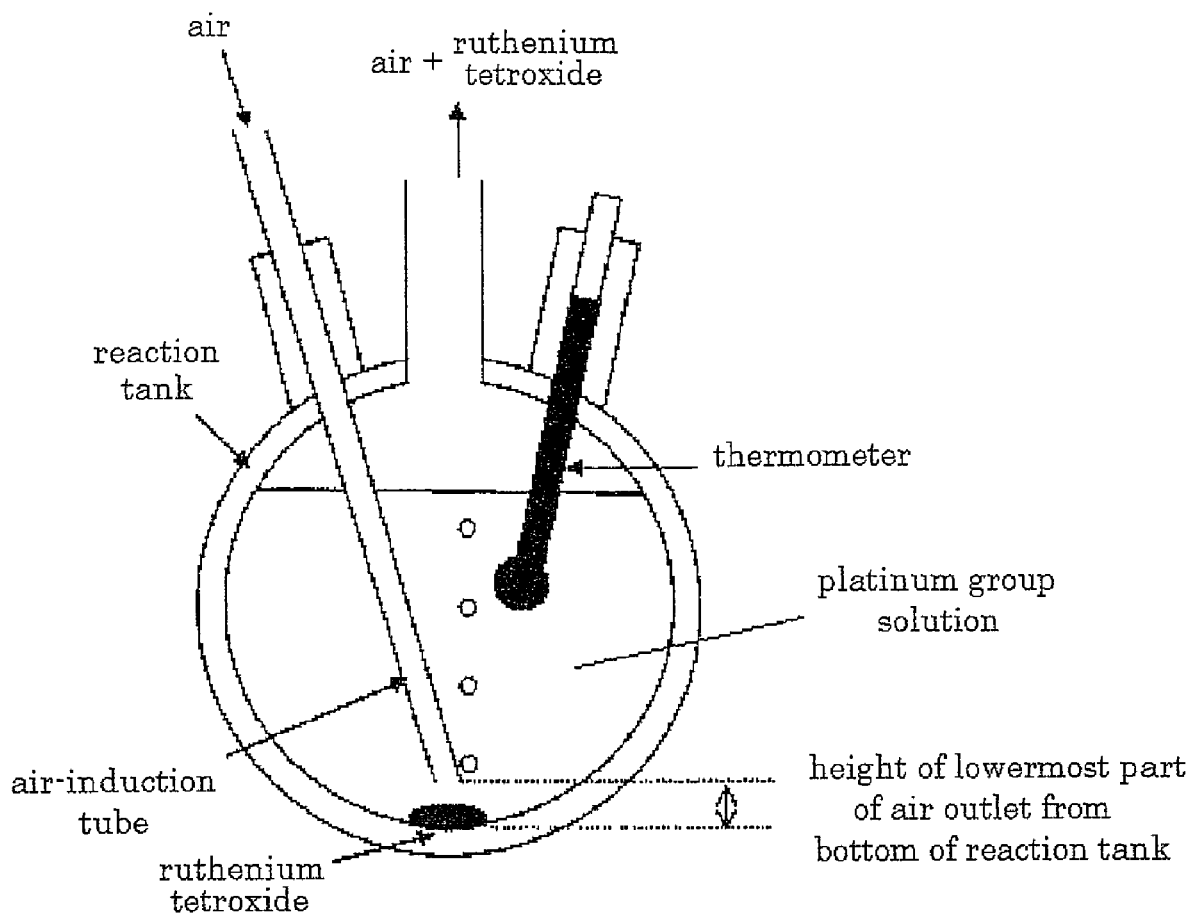
FIG. 2 illustrates a reaction tank of the ruthenium distillation apparatus used for Examples and Comparative Examples.

An example of the invention will be explained below. Example 1 was conducted with the apparatus shown in FIG. 1. The tip of an air-induction tube shown in FIG. 2 was inserted and arranged at the height of 5 mm from the bottom of the reaction tank. 70 L of hydrochloric acid acidic solution containing ruthenium and other platinum group metal (Rh, Ir, Pd, Pt) at pH of 1 was added into the reaction tank located in a heating mantle. Then, 14 kg of sodium bromate was added to the solution to generate ruthenium tetroxide, and air was introduced into the solution at the rate of 70 L/minute while the reaction tank was heated by the heating mantle.

During the reaction, purified water was pulled through the air-induction tube at the rate of 0.3 L/hour to prevent clogging. Air containing ruthenium tetroxide vapor was flowed through a 3% sodium bromate solution in a trap tank heated at 80° C. and led to a 6-normality hydrochloric acid solution in an absorption tank, and ruthenium tetroxide vapor was recovered as a ruthenium chloride solution. Since the air after passing through the absorption liquid contained bromine gas generated by the decomposition of sodium bromate, the bromine was absorbed from the air into a 16% sodium hydroxide solution before the air was discharged by an air pump. As distillation, air was sucked into the solution for 2 hours while the solution being heated at 80° C.

Table 1 shows the composition and amount of the liquid in each tank, and resulting distribution ratios. In Example 1, in which the height of the lowermost part of the air outlet was 5 mm from the bottom of reaction tank, the ruthenium concentration in the reaction tank after the distillation was less than 0.001 g/L., showing that ruthenium was removed from the reaction tank. Almost whole quantity of platinum group metal other than ruthenium remained in the reaction tank, thereby platinum group metal other than ruthenium was not contained in the absorption tank. Further, by arranging two absorption tanks in series, almost whole quantity of ruthenium was recovered, and it was separated from other platinum group metal.

TABLE 1

|  | Reaction tank before distillation | Reaction tank after distillation | Absorption tank after distillation (1) | Absorption tank after distillation (2) |
| --- | --- | --- | --- | --- |
| Ru | 41.6 g/L | <0.001 g/L | 48.1 g/L | 0.53 g/L |
| Rh | 10.8 g/L | 10.0 g/L | <0.001 g/L | <0.001 g/L |
| Ir | 1.8 g/L | 1.6 g/L | <0.001 g/L | <0.001 g/L |
| Pd | 0.22 g/L | 0.21 g/L | <0.001 g/L | <0.001 g/L |
| Pt | 0.18 g/L | 0.17 g/L | <0.001 g/L | <0.001 g/L |
| amount of liqid | 70 L | 74 L | 60 L | 70 L |
| Ru distribution ratio | 100% | <0.01% | 99% | 1.3% |
| Rh distribution ratio | 100% | 98% | <0.01% | <0.01% |
| Ir distribution ratio | 100% | 94% | <0.01% | <0.01% |
| Pd distribution ratio | 100% | 101% | <0.01% | <0.01% |
| Pt distribution ratio | 100% | 100% | <0.01% | <0.01% |

EXAMPLE 2

Example 2 of the invention will be explained below based on the result of the composition and amount of the liquid in each tank, and resulting distribution ratios shown in Table 2. Example 2 was conducted with the same apparatus and procedures as Example 1 except that the tip of the air-induction tube was arranged at the height of 20 mm from the bottom of the reaction tank. 14 kg of sodium bromate was added to the solution, and distillation was conducted for 2 hours with the solution being heated at 80° C. and air being sucked into the solution at the rate of 70 L/minute.

The ruthenium concentration in the reaction tank after the distillation was less than 0.001 g/L, showing that ruthenium was removed from the reaction tank. Almost whole quantity of platinum group metal other than ruthenium remained in the reaction tank, thereby platinum group metal other than ruthenium was not contained in the absorption tank. Further, by arranging two absorption tanks in series, almost whole quantity of ruthenium was recovered, and it was separated from other platinum group metal.

TABLE 2

|  | Reaction tank before distillation | Reaction tank after distillation | Absorption tank after distillation (1) | Absorption tank after distillation (2) |
|---|---|---|---|---|
| Ru | 44.3 g/L | <0.001 g/l | 46.6 g/L | 1.5 g/L |
| Rh | 19.7 g/L | 17.2 g/L | <0.001 g/L | <0.001 g/L |
| Ir | 0.28 g/L | 0.25 g/L | <0.001 g/L | <0.001 g/L |
| Pd | 0.20 g/L | 0.18 g/L | <0.001 g/L | <0.001 g/L |
| Pt | 0.15 g/L | 0.13 g/L | <0.001 g/L | <0.001 g/L |
| amount of liqid | 70 L | 80 L | 64 L | 70 L |
| Ru distribution ratio | 100% | <0.01% | 96% | 3.4% |
| Rh distribution ratio | 100% | 100% | <0.01% | <0.01% |
| Ir distribution ratio | 100% | 102% | <0.01% | <0.01% |
| Pd distribution ratio | 100% | 103% | <0.01% | <0.01% |
| Pt distribution ratio | 100% | 99% | <0.01% | <0.01% |

COMPARATIVE EXAMPLE 1

Comparative Example 1 will be explained below. Comparative Example 1 was conducted with the same apparatus and procedures as Example 1 except that the tip of the air-induction tube was arranged at the height of 30 mm from the bottom of the reaction tank. Table 3 shows the composition and amount of the liquid in each tank, and resulting distribution ratios. 14 kg of sodium bromate was added to the solution, and distillation was conducted for 2 hours with the solution being heated at 80° C. and air being sucked into the solution at the rate of 70 L/minute.

The ruthenium concentration in the reaction tank after the distillation was 0.12 g/L, and part of ruthenium was remained in the reaction tank. The reason for this result is that since the tip of the air-induction tube was arranged at the height of 30 mm from the bottom of the reaction tank, the bottom area of the reaction tank was not stirred sufficiently, thereby ruthenium tetroxide, which has large specific gravity, remained in the bottom, and could not volatilize. When other platinum group metal was recovered from the reaction tank after the distillation, a sufficient grade was not obtained.

TABLE 3

|  | Reaction tank before distillation | Reaction tank after distillation | Absorption tank after distillation (1) | Absorption tank after distillation (2) |
|---|---|---|---|---|
| Ru | 26.1 g/L | 0.12 g/L | 24.4 g/L | 0.45 g/L |
| Rh | 11.3 g/L | 11.1 g/L | <0.001 g/L | <0.001 g/L |

TABLE 3-continued

|  | Reaction tank before distillation | Reaction tank after distillation | Absorption tank after distillation (1) | Absorption tank after distillation (2) |
|---|---|---|---|---|
| Ir | 0.66 g/L | 0.64 g/L | <0.001 g/L | <0.001 g/L |
| Pd | 1.0 g/L | 0.95 g/L | <0.001 g/L | <0.001 g/L |
| Pt | 0.17 g/L | 0.17 g/L | <0.001 g/L | <0.001 g/L |
| amount of liqid | 70 L | 70 L | 72 L | 70 L |
| Ru distribution ratio | 100% | 0.46% | 96% | 1.7% |
| Rh distribution ratio | 100% | 98% | <0.01% | <0.01% |
| Ir distribution ratio | 100% | 97% | <0.01% | <0.01% |
| Pd distribution ratio | 100% | 95% | <0.01% | <0.01% |
| Pt distribution ratio | 100% | 100% | <0.01% | <0.01% |

COMPARATIVE EXAMPLE 2

Comparative Example 2 will be explained below. Comparative Example 2 was conducted with the same apparatus and procedures as Example 1 except that the tip of the air-induction tube was arranged at the height of 3 mm from the bottom of the reaction tank. 70 L of liquid was added into the reaction tank and air was sucked into the reaction tank. when the air-induction tube vibrated and glasses came into contact with each other. The experiment was then discontinued. It was because the distance between the tip of the air outlet and the bottom of the reaction tank was so short that airflow was hindered and air bubbles vibrated the air-induction tube, resulting in contact with the reaction tank. The arrangement of Comparative Example 2 was inappropriate since it may damage the reaction tank and the air-induction tube.

Figure 3:
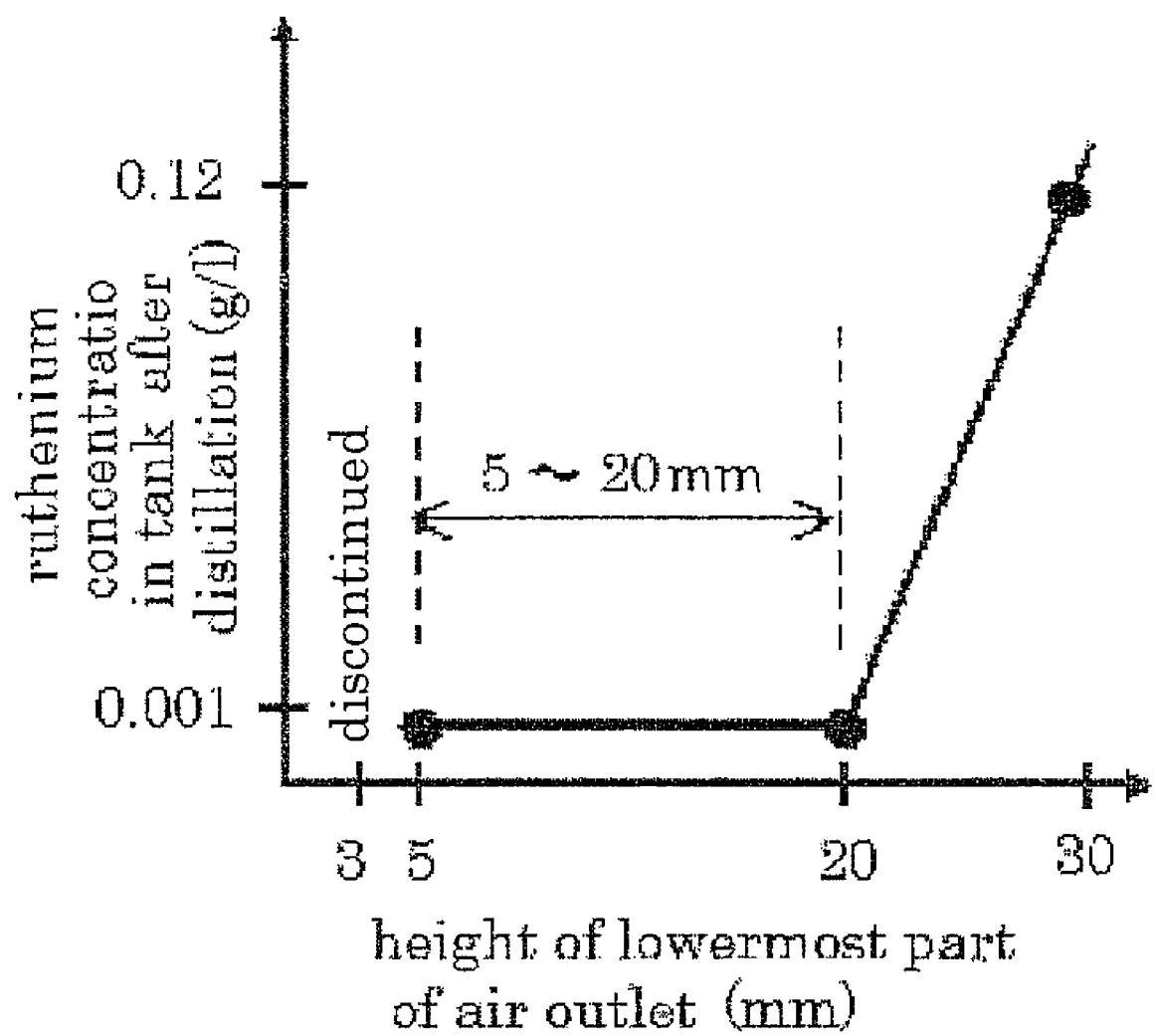
FIG. 3 illustrates the results of Examples and Comparative Examples.

FIG. 3 shows the relationship between the height from the bottom of the reaction tank to the lowermost part of the air-induction tube and the ruthenium concentration in the solution in the reaction tank after distillation based on the results of Examples 1 and 2, and Comparative Examples 1 and 2. It can be seen that the ruthenium concentration was kept low and ruthenium was removed efficiently when the height was in the range of 5-20 mm.

What is claimed is:

1. A method for selectively removing ruthenium from a solution containing ruthenium and at least one other platinum group metal selected from the group consisting of platinum, palladium, rhodium and iridium, comprising adding an oxidizer to the solution to convert ruthenium into ruthenium tetroxide, wherein:

the solution is disposed in a reaction tank, the solution is stirred only by air sucked into the reaction tank by reducing the pressure within the reaction tank, and at least one outlet of the air is arranged such that the lowermost part thereof is positioned at the height of 5-20 mm from the bottom of the reaction tank.

2. The method of claim 1, wherein the inside diameter of the at least one outlet of air is from 5 to 30 mm.

* * * * *